(12) United States Patent
Hyatt

(10) Patent No.: US 7,194,154 B2
(45) Date of Patent: Mar. 20, 2007

(54) OPTICAL CONNECTOR

(75) Inventor: Edward Craig Hyatt, Durham, NC (US)

(73) Assignee: Sony Ericsson Mobile Communications AB (SE)

( * ) Notice: Subject to any disclaimer, the term of this patent is extended or adjusted under 35 U.S.C. 154(b) by 0 days.

(21) Appl. No.: 11/203,722

(22) Filed: Aug. 15, 2005

(65) Prior Publication Data
US 2007/0036484 A1    Feb. 15, 2007

(51) Int. Cl.
*G02B 6/26*    (2006.01)
*G02B 6/00*    (2006.01)

(52) U.S. Cl. .................................... 385/25; 385/26
(58) Field of Classification Search ............ None
See application file for complete search history.

(56) References Cited

U.S. PATENT DOCUMENTS

| | | | |
|---|---|---|---|
| 4,525,025 A | 6/1985 | Hohmann et al. | |
| 5,810,606 A | 9/1998 | Ballast et al. | |
| 6,353,693 B1* | 3/2002 | Kano et al. | 385/26 |
| 6,658,272 B1* | 12/2003 | Lenchik et al. | 455/575.1 |
| 6,759,759 B2* | 7/2004 | Kojima et al. | 307/10.1 |
| 6,766,182 B2* | 7/2004 | Janninck et al. | 455/575.3 |
| 7,078,718 B2* | 7/2006 | Poslowsky | 250/551 |

FOREIGN PATENT DOCUMENTS

WO    WO 00/17687    3/2000

OTHER PUBLICATIONS

PCT International Search Report, International Application No. PCT/US2006/007894, Mailed on Aug. 21, 2006.
Annex to From PCT/ISA/206: Communication Relating to the Results of the Partial International Search, International Application No. PCT/US2006/007894, Mailed Jun. 28, 2006.

* cited by examiner

*Primary Examiner*—Sung Pak
(74) *Attorney, Agent, or Firm*—Coats & Bennett, P.L.L.C.

(57) ABSTRACT

A rotatable connector comprises a plurality of optically conductive light rings adapted to mount to a first rotatable component; a plurality of light emitters for illuminating said light rings; a plurality of light detectors adapted to mount on a second rotatable component for detecting illumination of the photoconductive rings on the first rotatable component over a predetermined range of rotation.

24 Claims, 10 Drawing Sheets

OPTICAL CONNECTOR

BACKGROUND

The present invention relates generally to connectors for electronic devices, such as mobile telephones and personal digital assistants, and more particularly to a rotating optical connector.

Mobile telephones and personal digital assistants with housing components that rotate about an axis are known. Electrical connections between components in the rotating housing sections are conventionally made by means of a cable or wire passing through the rotating connector. This means of connection limits the amount of rotation because the cable or wire twists when the housing sections are rotated. Consequently, most conventional rotating connector designs limit rotation to approximately 180°. Therefore, there is a need for new rotating connectors that permit a full 360° of rotation in either direction.

SUMMARY

The present invention provides a rotating connector that rotates 360° in either direction. The rotating connector can be used to connect electrical circuits contained in rotating housing sections. The rotating connector includes first and second optical couplers. A first optical coupler includes a plurality of light rings that can be selectively illuminated by light emitters. The second optical coupler includes a plurality of light detectors for detecting the illumination of the light rings. The light rings are made of an optically-conductive polymer that propagates light throughout the entire ring when illuminated by the light emitter.

DETAILED DESCRIPTION

Figure 1:
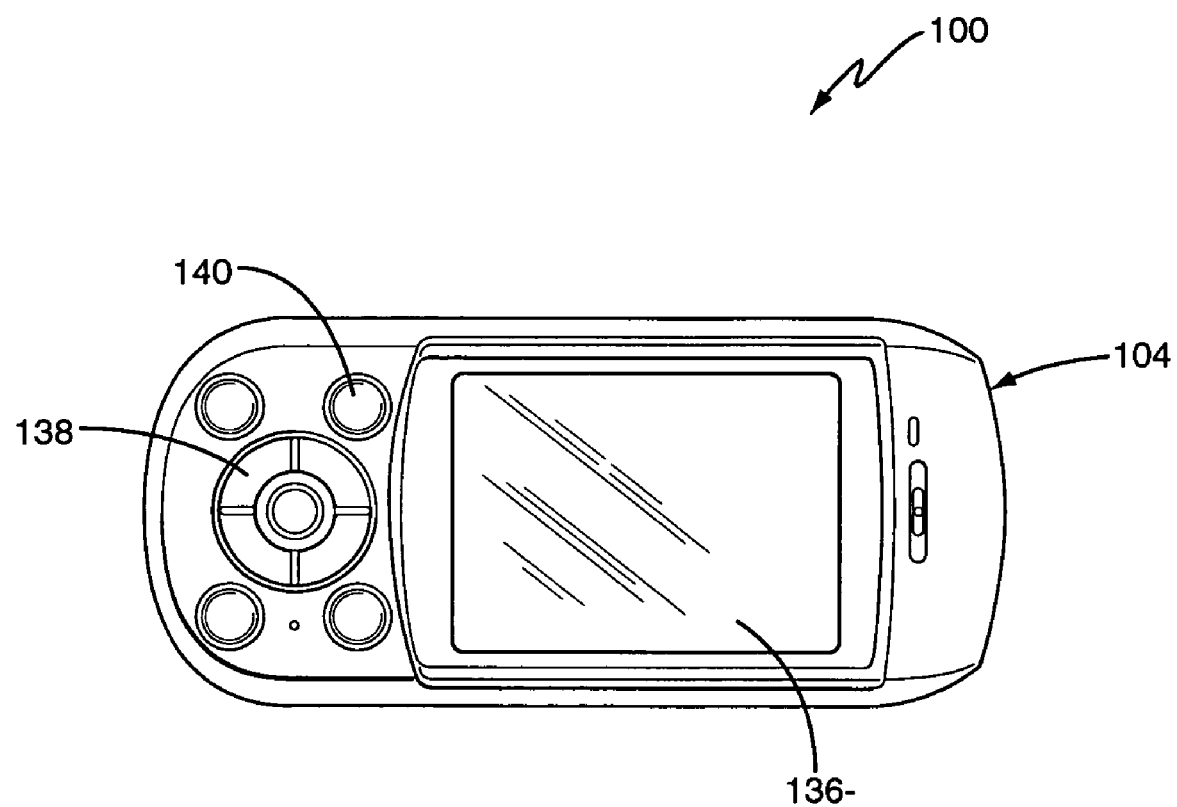
FIG. 1 is a frontal view of a mobile telephone constructed in accordance with the present invention with the top section of the housing in a closed position.
Figure 2:
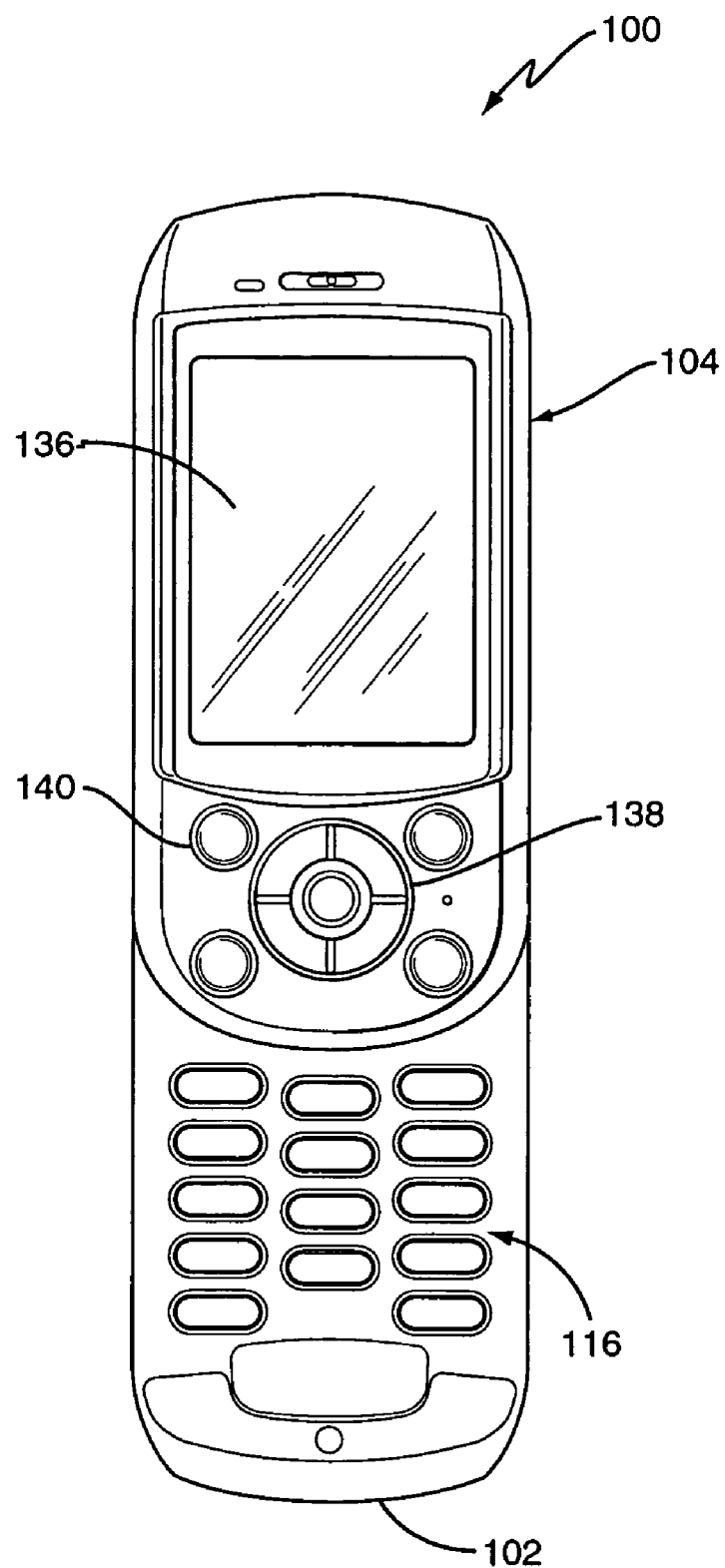
FIG. 2 is a frontal view of a mobile telephone constructed in accordance with the present invention with the top section of the housing in an open position.

Referring now to the drawings, an exemplary portable electronic device according to the present invention is shown. More particularly, FIGS. 1 and 2 illustrate a mobile communication device, indicated generally by the numeral 100, constructed in accordance with the present invention. Those skilled in the art will appreciate, however, that the present invention is in no way restricted to mobile communication devices and has general application in a wide range of portable electronic devices, including personal digital assistants, video and/or audio players, digital cameras, and video cameras.

The mobile communication device 100 includes first and second housing sections 102 and 104, respectively, which rotate relative to one another about a vertical axis. In a preferred embodiment, a full 360 degrees of rotation in either direction is permitted. FIG. 1 shows the mobile telephone 100 when the first and second housing sections 102 and 104 are rotated to a closed position (0° rotation). FIG. 2 shows the mobile communication device 100 when the housing sections 102 and 104 are rotated to an open position (180° rotation).

Figure 3:
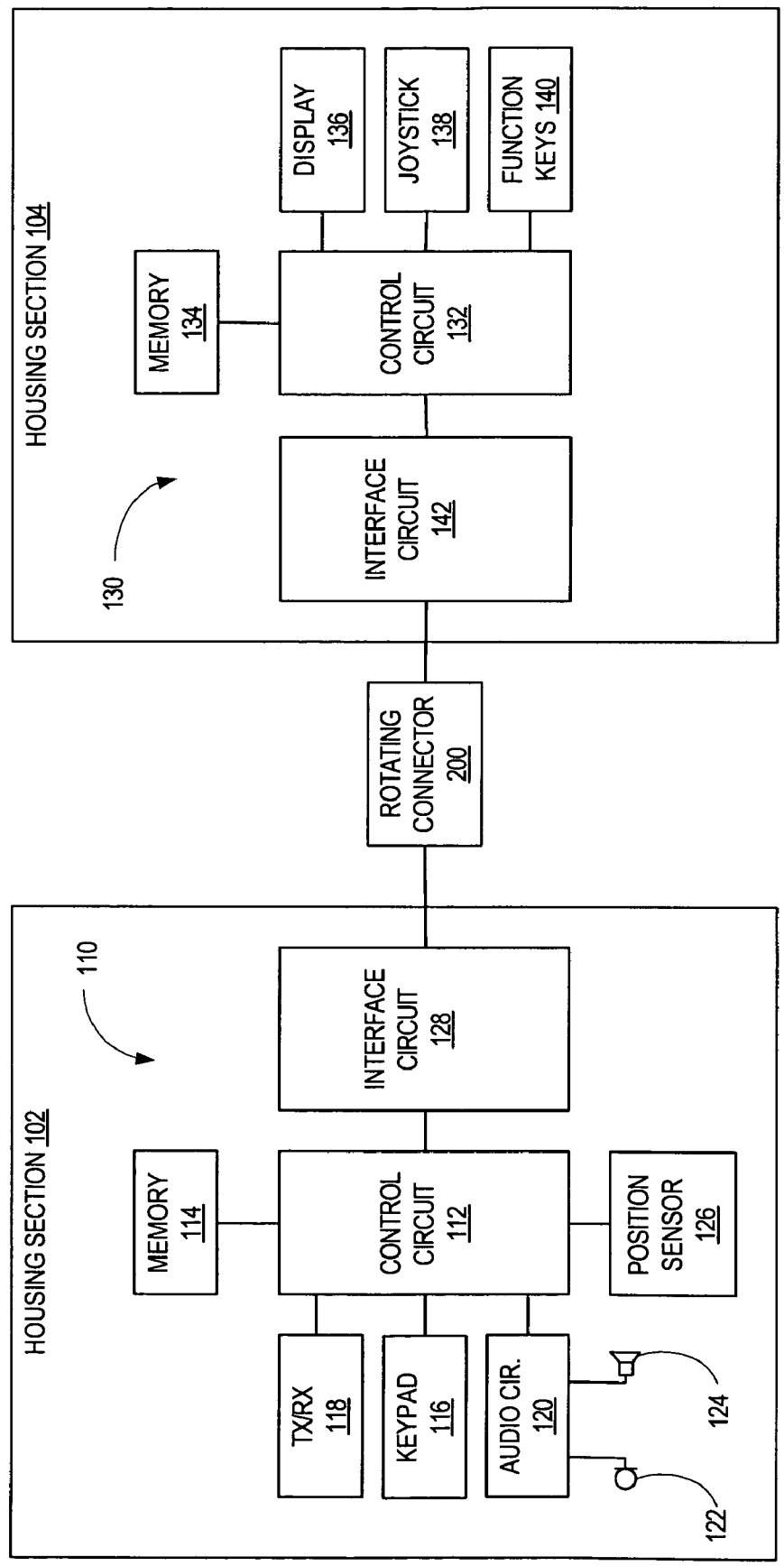
FIG. 3 is a functional block diagram illustrating the main components of the mobile communication device.

FIG. 3 illustrates the functional elements of the mobile communication device 100. A first circuit 110 is disposed in the first housing section 102. A second circuit 130 is disposed in the second housing section 104. Circuits 110 and 130 are operatively connected by means of a rotatable connector 200. Circuit 110 may be powered by a battery. Circuit 130 may have a separate battery. Alternatively, power may be transferred between circuits 110 and 130, as hereinafter described.

Circuit 110 in housing section 102 includes a control circuit 112, memory 114, keypad 116, transceiver 118, audio circuit 120 and interface circuit 128. The control circuit 112, which may include a microprocessor controls the overall operation of the mobile communication device 100 according to program instructions stored in memory 114. Memory 114 stores program instructions and data needed for operation. The keypad 116 is part of the user interface. In the exemplary embodiment, the keypad 116 is a standard phone keypad 116 that is actuated by the user to control the functions of the mobile communication device 100. Keypad 116 is used when the housing section 104 is in the open position. Transceiver 118 enables communication with remote devices. Transceiver 118 may, for example, comprise a standard cellular transceiver and/or short-range wireless interface, such as a Bluetooth transceiver. Audio circuit 120 processes audio signals input via microphone 122 and output via speaker 124. Microphone 122 converts acoustic signals to electrical audio signals. Speaker 124 converts electrical audio signals into acoustic signals. Interface circuit 128 interfaces circuit 110 with the rotating connector 200 to enable communication between circuits 110 and 130.

Circuit 130 in housing section 104 includes control circuit 132, memory 134, display 136, joystick control 138, one or more function keys 140, and interface circuit 142. Control circuit 132, which may comprise a microprocessor, controls the display 136 and receives input from the joystick 138 and function keys 140. Memory 134 stores program code and data used by the control circuit 132. Interface circuit 142 interfaces circuit 130 with the rotating connector 200 to enable communication between circuits 110 and 130.

Display 136, joystick 138, and function keys 140 form part of the user interface. Display 136 displays information, such as menus, addresses, phone numbers, and other application data. Display 136 may comprise a liquid crystal display or touch screen display. The joystick control 138 and function keys 140 may be used to control the operation of the mobile communication device 100. Joystick control 138 enables the user to navigate through menus presented on the display 136, move a pointer on the display 136, and to select menu items and other items presented on the display 136. Function keys 140 may have functions assigned thereto that are activated or enabled by pressing a corresponding function key 140. For example, in a default mode, the function keys 140 may be used to initiate and/or end a call. The particular functions assigned to function keys 140 may change depending on the operating mode.

Figure 4:
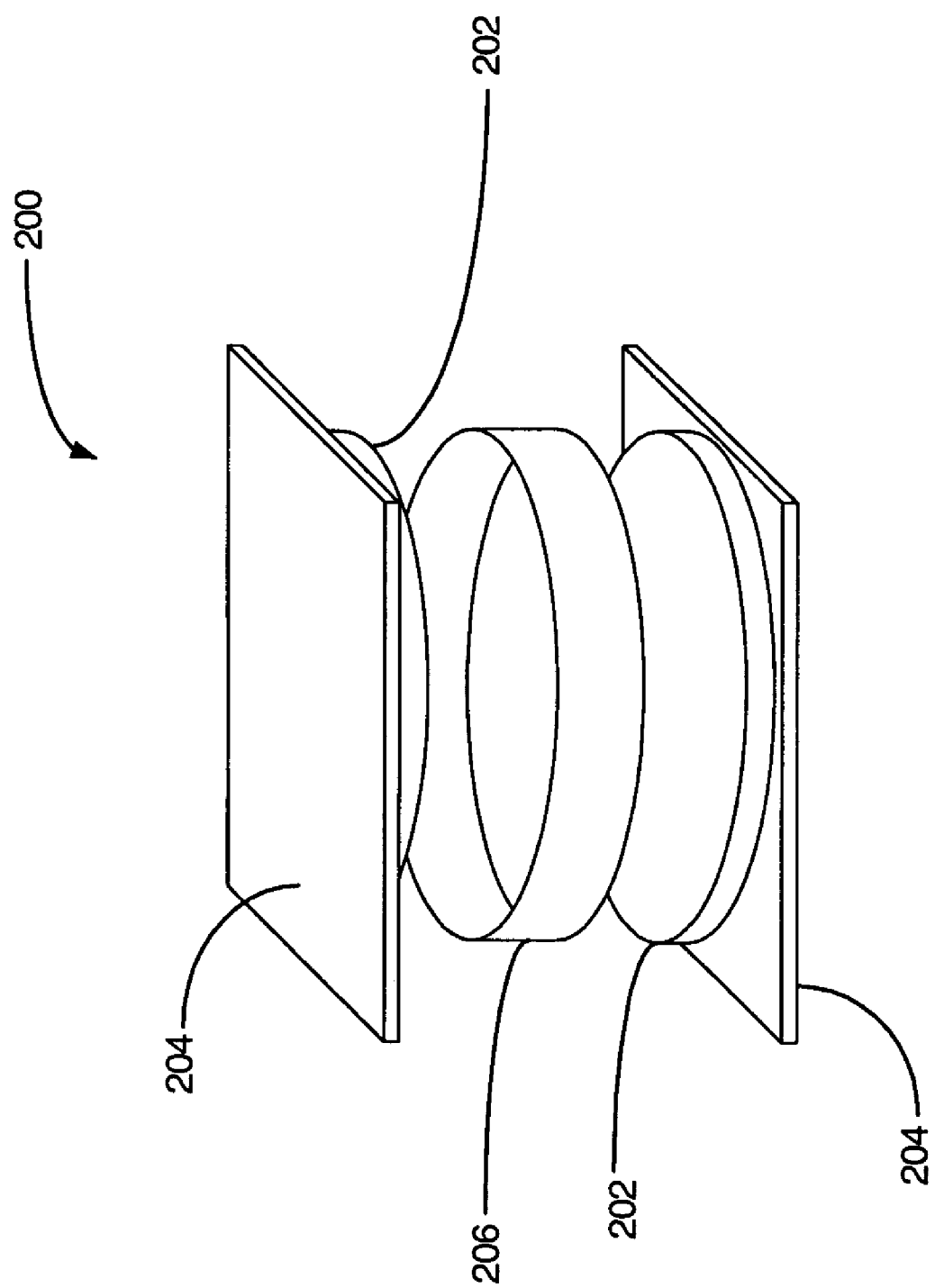
FIG. 4 illustrates an exemplary rotating connector for electrically connecting the first and second housing sections.

FIG. 4 illustrates one exemplary rotating connector 200. Rotating connector 200 comprises first and second optical couplers 202. In this particular embodiment, the optical couplers 202 are disposed in opposing face-to-face relationship and are centered on the axis of rotation of the housing sections 102 and 104. The optical couplers 202 may be surrounded by a light shield 206.

Figure 5:
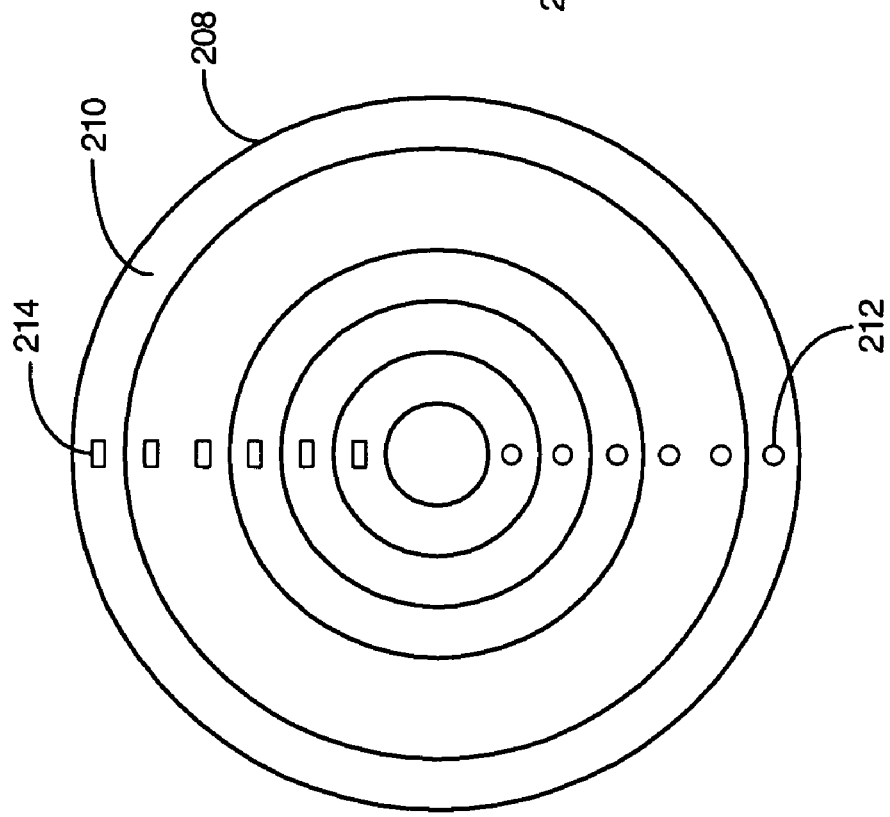
FIG. 5 is a plan view of an optical coupler used in the rotating connector for bidirectional communication.
Figure 6:
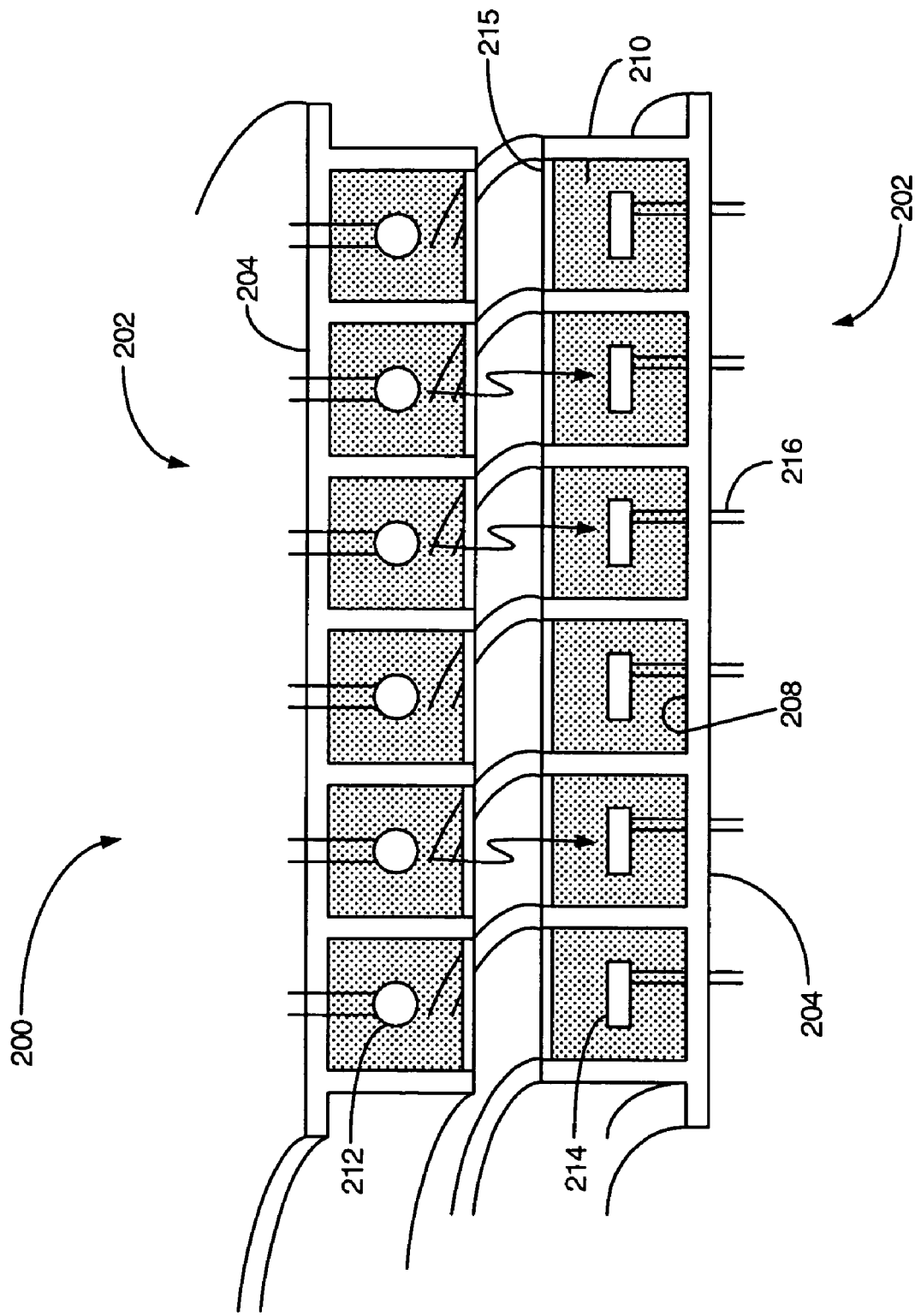
FIG. 6 is a section view of the rotating connector.

FIGS. 5 and 6 illustrate an exemplary optical coupler 202 in more detail. FIG. 5 shows the optical coupler 202 in plan view. FIG. 6 shows a sectional view of the optical coupler 202. The optical couplers 202 include a substrate 204 having a plurality of light channels 208 formed therein concentrically arranged about the axis of rotation. The substrate 204 is preferably electrically non-conductive. The bottom surface and side walls of the light channels 208 are coated with a reflective material. The light channels 208 are filled with an optically conductive polymer to form concentric light rings 210. In the exemplary embodiment shown in FIG. 5, each light ring 210 has an associated light emitter 212 and light detector 214. In the exemplary embodiment, the light emitters 212 and light detectors 214 are embedded in the light rings 210, though embedding is not required. The electrical leads 216 for light emitters 212 and light detectors 214 pass through the substrate 204. The light emitters 212, such as light emitting diodes (LEDs), illuminate respective light rings 210. An optical fiber may also be used as a light emitter 212, where one end of the optical fiber is connected to an external light source, and the opposite end emits light into a respective light ring 210. The light is conducted by the light ring 210 so that the entire light ring is illuminated. The light detectors 214, such as photodiodes, in the opposing optical coupler 202 detect illumination of the light rings 210. Alternatively, an optical fiber may be used to convey light to an external light detector 214. Thus, digital signals can be optically transmitted between housing sections 102 and 104 by illuminating the light ring 210 in one optical coupler 202 in accordance with a digital sequence, and detecting the resulting illumination pattern with the light detectors 214 in the opposing optical coupler 202.

The optically conductive polymer propagates light around a light conducting ring 210 when the corresponding light emitter 212 is illuminated. Because the entire light ring 210 illuminates, the light detector 214 can detect the illumination at any angular position over a full 360 degrees of rotation. A prismatic film 215, such as the Vikuiti Brightness Enhancing Films (BEF) manufactured by 3M, may be disposed over the light rings 210 to enhance the brightness of the light rings 210 when they are illuminated and to help distribute the light around the light ring 210. The prismatic film 215 includes an array of prisms that concentrate light within a particular range of viewing angles. The prisms may extend concentrically around the light rings 210. Alternatively, the prisms may extend radially. The prisms transmit light rays normal to the film 215, but internally reflect oblique light rays. The oblique light rays are "recycled" by internally reflecting the light rays back towards the prismatic film 215 closer to normal so as to pass the light rays through the prismatic film 215. The process of internal reflection and recycling concentrates light in a particular range of viewing angles. More than one layer of prismatic film 215 may be used with the prisms oriented in different directions.

Figure 7:
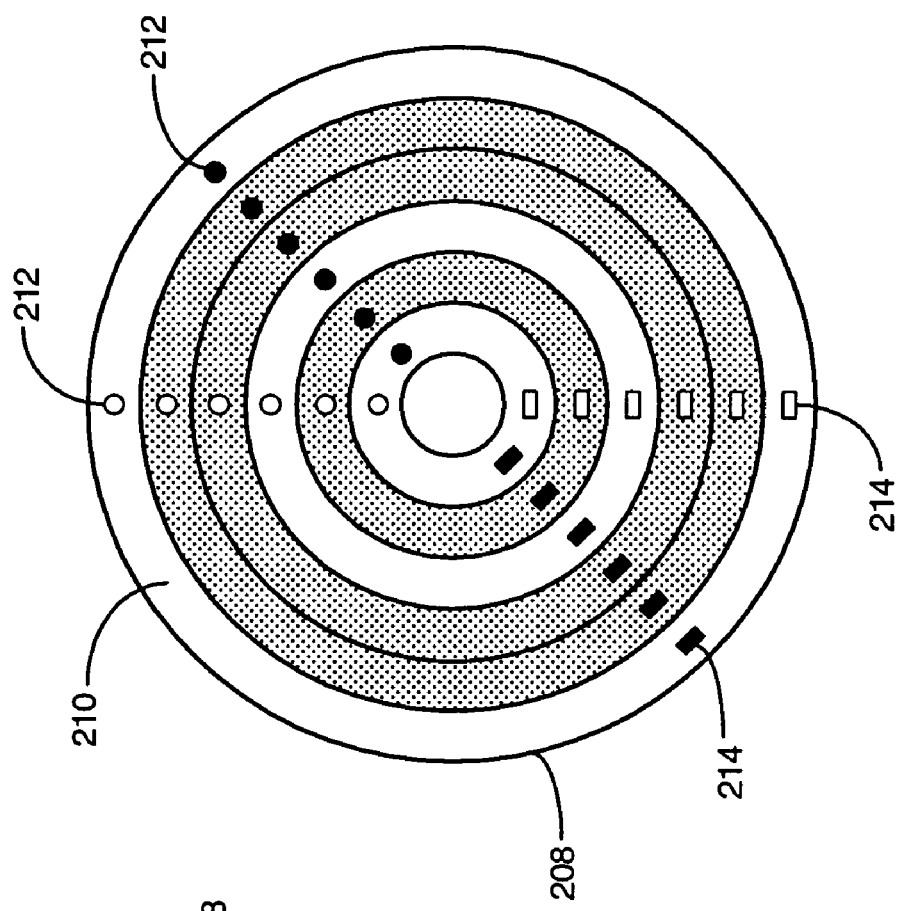
FIG. 7 is a plan view of an optical coupler.

FIG. 7 illustrates the relative positions of the light emitters and detectors 212 and 214 when the optical couplers 202 are rotated 45 degrees relative to one another. The light emitters 212 and 214 for a first optical coupler 202 are shown in white. The light emitters 212 and light detectors 214 for the second optical coupler 202 are superimposed and shown in black. Due to the circular geometry of the optical couplers 202, the light detectors 214 for the top optical conductors 202 remain aligned with the respective light rings 210 over 360 degrees of rotation. Thus, light detectors 214 are able to detect illumination of their corresponding light rings 210 at any angular position.

Optical couplers 202 may be surface mounted on printed circuit boards containing circuits 110 and 130, for example, using a ball grid array. Alternatively, the optical couplers 202 may be mounted to the housing sections 102 and 104 and connected to the printed circuit boards by means of a cable. Other mounting technologies may also be used.

Because each light ring 210 corresponds to one communication channel, the optical couplers 202 are capable of half-duplex, bidirectional transmission of digital information between the housing sections 102 and 104. Any given communication channel 208 can be used to transmit or receive at a given time. However, a single channel 208 cannot be used to transmit and receive simultaneously. In some embodiments, selected channels 208 may be used only for transmission, while other selected channels 208 may be used only for reception. The light rings 210 for the transmit-only channels 208 can omit the light detector 214. Similarly, the receive-only channels 208 can omit the light rings 210 and emitters 212.

Figure 8:
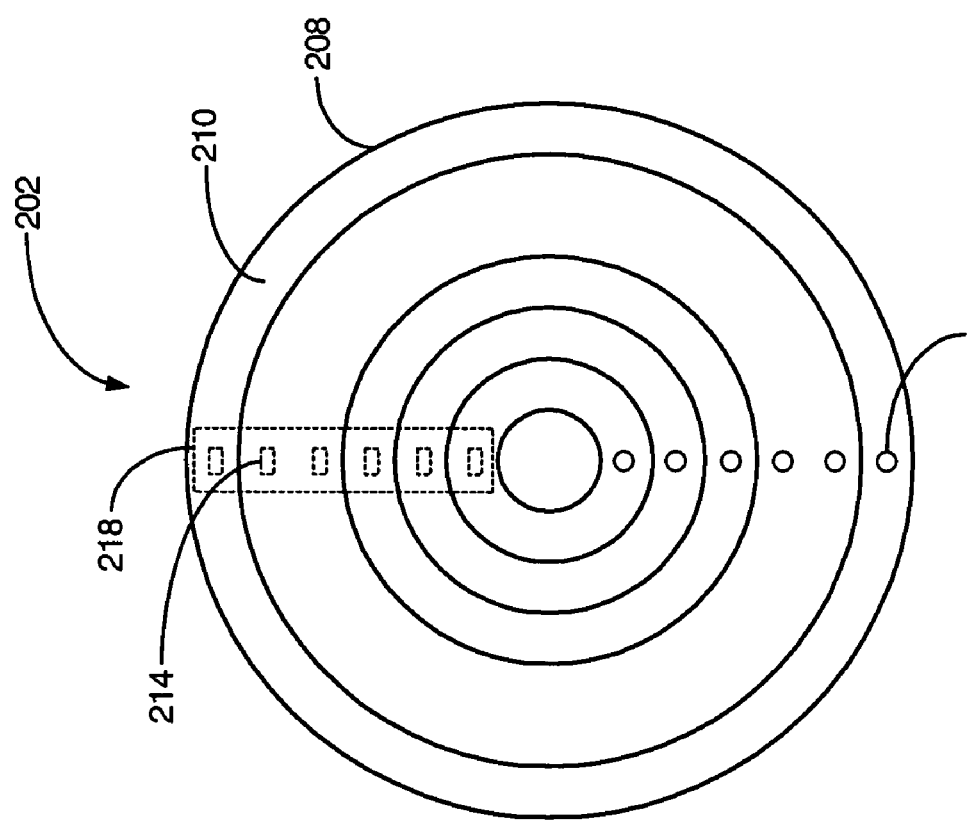
FIG. 8 is a plan view showing an optical coupler used in the rotating connector for unidirectional communication.

There may be some applications where bidirectional communication is not required. FIG. 8 illustrates an exemplary embodiment for one-way communication. As shown in FIG. 8, the optical coupler 202 on the transmit side is simplified by eliminating the light detectors 214. The optical coupler 202 for the transmit side includes the light rings 210 and light emitters 212 as previously described. On the receive side, the optical coupler 202 may comprises a light detector array 218 without light rings 210 or light emitters 212.

To avoid the necessity of a separate battery to power circuit 130, one pair of light rings 210 may be replaced by a pair of electrically conductive rings to enable power transfer between circuits 110 and 130. In this case, the electrically conductive ring pair may be electrically connected by brushes or roller contacts to maintain an electrical connection between the optical couplers 202 at all angles of rotation.

Figure 9:
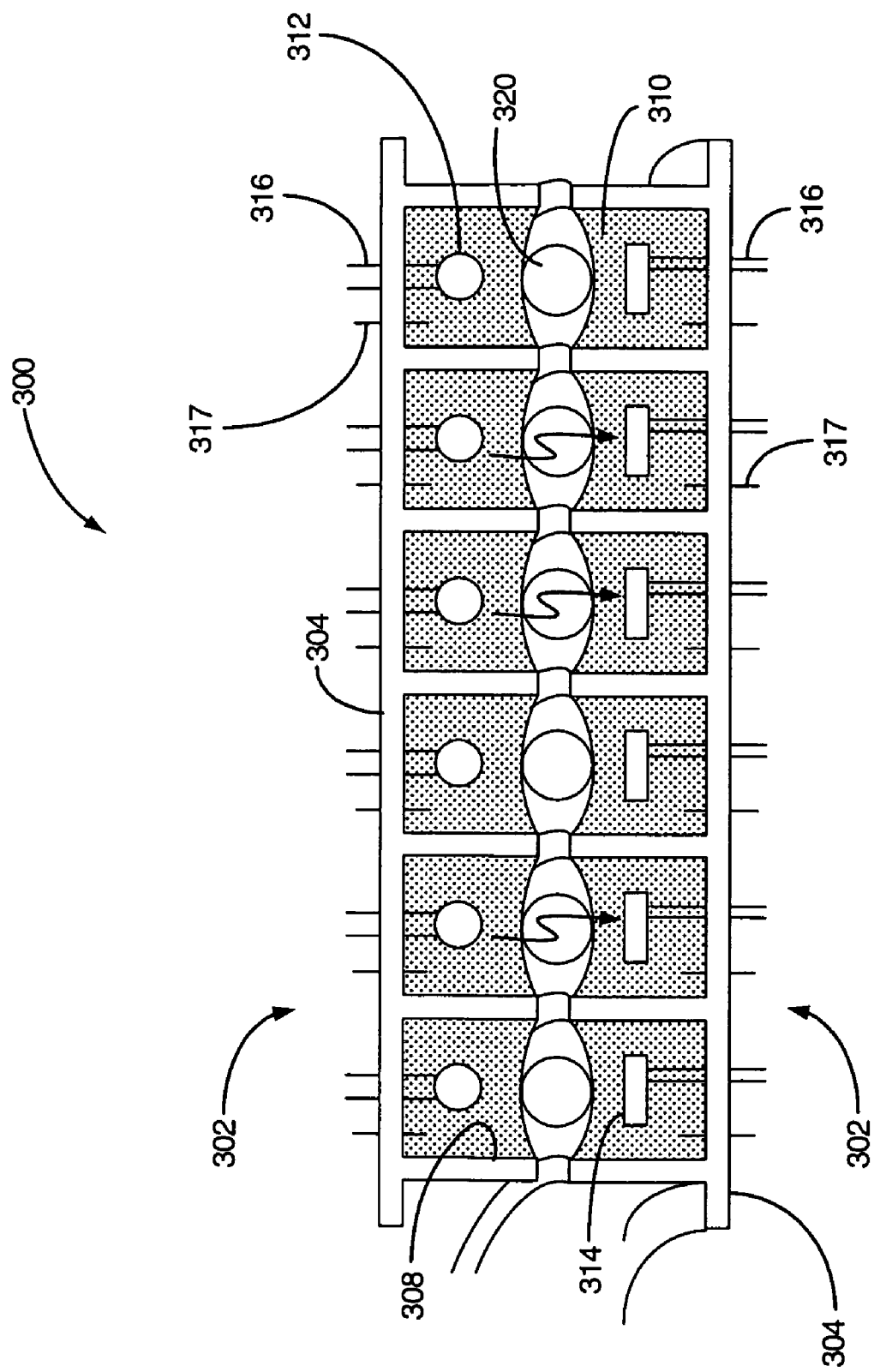
FIG. 9 is a section view of a second embodiment of the rotating connector.

FIG. 9 illustrates a second embodiment of the rotatable connector indicated generally the by numeral 300 that enables power to be transmitted. This embodiment is similar to the embodiment shown in FIGS. 1–8. Rotating connector 300 includes two optical couplers 302. The optical couplers 302 each include a substrate 304 having a plurality of light channels 308 and light rings 310 as previously described. Each light ring 310 includes an associated light emitter 312 and light detector 314 with leads 316. The optical couplers 302 can optically transmit and/or receive digital information as previously described.

In the embodiment shown in FIG. 9, the polymer used to form the light rings 310 is not only optically conductive, but is also electrically conductive. An additional electrical lead 317 connects to the light rings. The light emitters 312 and light detectors 314 are electrically insulated from the light conducing rings 310. A conductive sphere 320 is disposed between the light rings 310 to electrically connect the opposing light rings 310 in the optical couplers 302. The facing surfaces of the light rings 310 may have a slightly concave shape to hold the conductive sphere 320 in place.

In this embodiment, data can be transmitted electrically as well as optically. To transmit information, an electrical signal, e.g., voltage or current, is applied to the light ring 310 on the transmit side. The electrical signal is conducted from the light ring 310 on the transmit side, through the conductive sphere 320, to the light ring 310 on the receive side. A Schmitt trigger may be used to detect the electrical signals on the receive side. Thus, each light ring 310 provides two communication channels: an optical channel and an electrical channel. In one exemplary embodiment, the optical channel may be used for high speed digital data. The electrical channel may be used to transfer power, ground or analog signals. Those skilled in the art will recognize that the electrical channel may also be used to transmit digital data.

Figure 10:
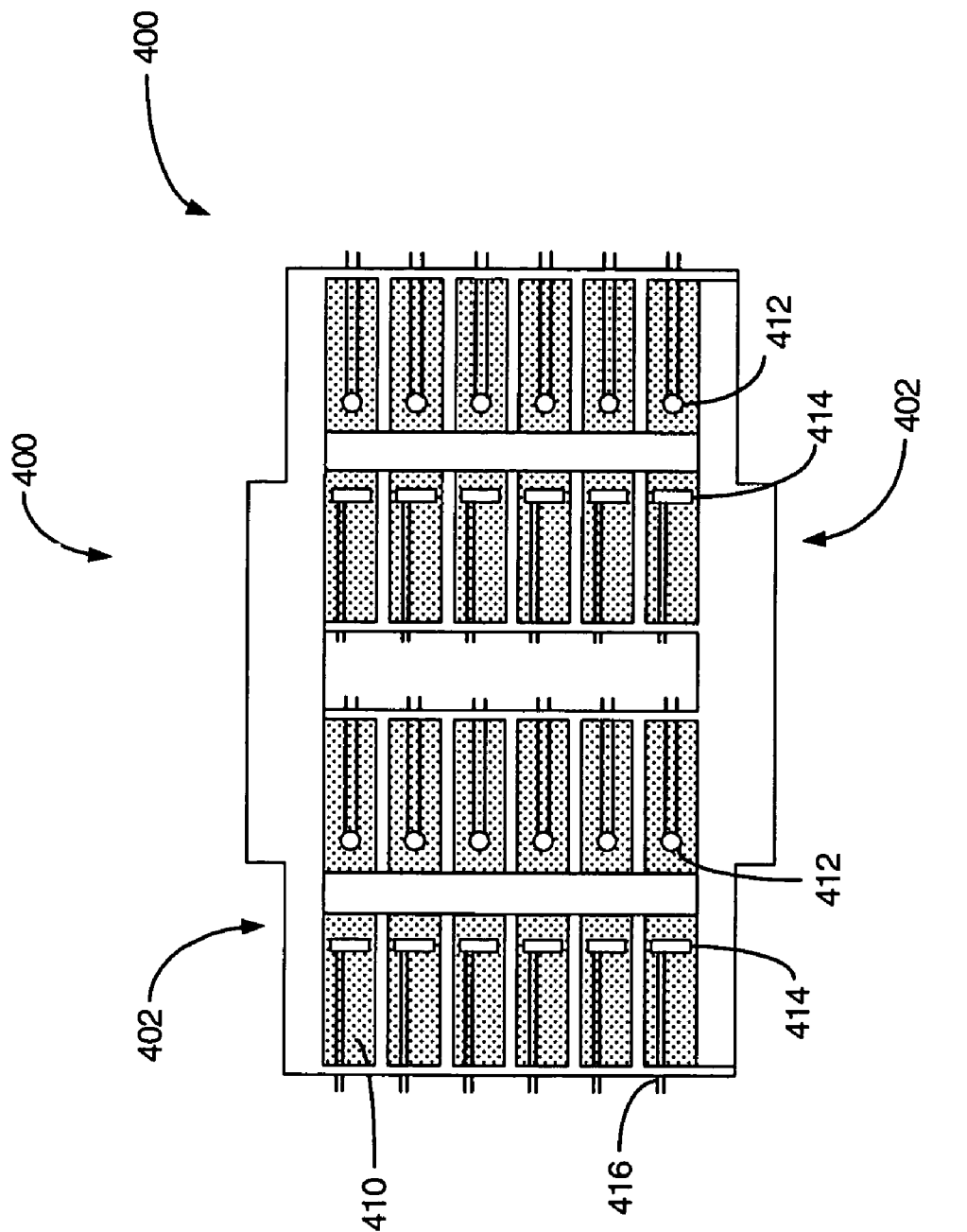
FIG. 10 is section view of a third embodiment of the rotating connector.

FIG. 10 illustrates another embodiment of the rotating connector indicated generally by the numeral 400. In this embodiment, the rotating connector 400 includes two optical couplers 402; an inner coupler and an outer coupler. Each optical coupler 402 comprises a plurality of vertically-stacked light rings 410. As in the first embodiment, each light conducting ring includes a light emitter 412 and a light detector 414 with leads 416. The basic operation of the optical couplers 402 is the same as previously described. When a light-conducting ring 410 in one optical coupler 402 is illuminated, the light is detected by a corresponding light detector 414 in the opposing coupler 402. As in the previous embodiment, this design allows light detection at any angular position over 360 degrees.

In some applications, it may be desirable to know the angular position of the housing sections 102 and 104 relative to one another. For example, it may be desirable to know when the housing section 102 is in the closed position, open position, or some intermediate position. The following describes various ways to detect the degree of rotation in terms of the embodiment of FIGS. 4–8. However, it will be appreciated that these angle detection methods also apply to the other embodiments described herein.

If the direction of rotation is not important, the degree of rotation from the closed position can be determined based on the output level of the light detector. The light transmitted around the light ring 210 will necessarily attenuate. The amount of attenuation is a function of the distance the light travels through the light ring 210. Thus, the control circuits 112 and 132 may determine the amount of relative rotation by monitoring the output level of the light detector 214. For example, based on the output level of the light detectors 214, the control circuits 112 and/or 132 may be determine that the housing section 104 has been rotated 30° from the closed position. In this case, however, it is not known which direction the housing section 104 is rotated. If the direction of rotation is important, the light rings 210 may be manufactured with an optical gradient so that attenuation will vary depending on the direction of rotation.

In another embodiment, one of the optical couplers 202 may include optical marks that can be detected by a separate optical detector that functions as a position sensor 126. The optical marks may be applied to one of the light rings 210. In this embodiment, the control circuit 112 can determine the angular position of the housing sections 102 and 104 by detecting and counting the optical marks when the housing sections 102 and 104 are rotated. Alternatively, position information may be encoded into the optical marks. For example, the optical marks could vary in width and or spacing so that the angular position can be determined from the pattern of the optical marks. As another example, unique optical marks similar to a bar code may be applied at fixed positions around the circumference of the optical coupler.

If one of the light rings 210 is electrically conductive, the position sensor 126 may detect a change in an output voltage due to relative rotation of the housing sections 102 and 104. An input voltage Vin may be applied at a fixed location on one light ring 210 and an output voltage Vout at a fixed locaton on the opposing light ring 210 may be measured. The light rings 210 act like a variable resistor so that the output voltage Vout will change responsive to relative rotation. If it is important to distinguish the direction of rotation, the light ring 210 may have a resistive gradient.

Figure 11:
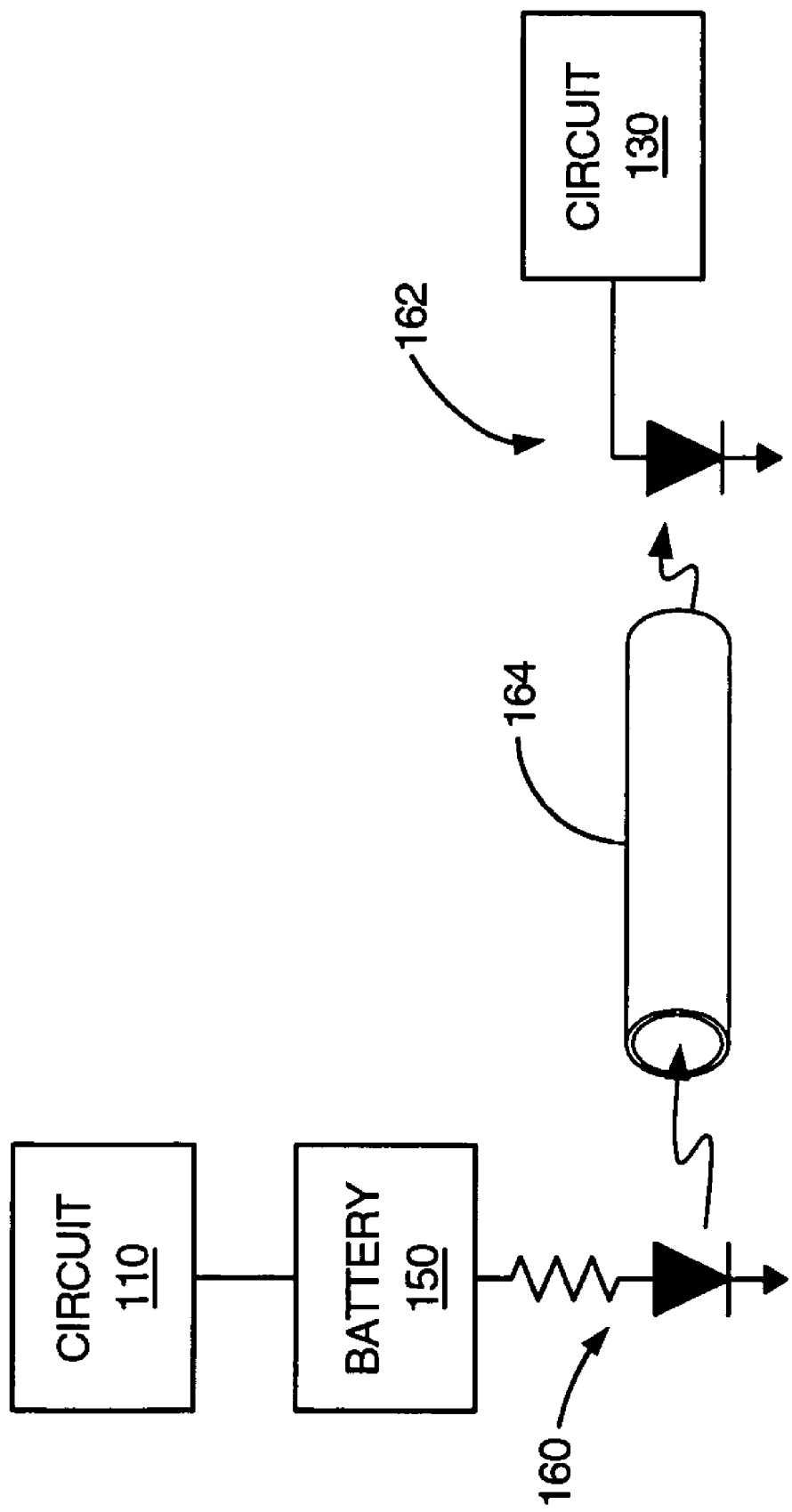
FIG. 11 illustrates an exemplary method of transmitting power through a rotating connector.

FIG. 11 illustrates an alternate method of powering circuit 130 using a power supply in circuit 110 and connector 200. If circuit 130 requires only a small amount of power, a high power LED 160 and photovoltaic cell 162 can be used to wirelessly transmit power from circuit 110 to circuit 130. The light from the high power LED 160 may be transmitted through an optical fiber 164 passing through the center of the rotating connector 200 and directed onto the photovoltaic cell 152, which converts the light energy to electrical energy to power circuit 130.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A rotatable connector comprising:
   a first optical coupler adapted to mount to a first rotatable component, said first optical coupler including a first optically conductive light ring and a first light emitter for illuminating said light ring;
   a second optical coupler adapted to mount on a second rotatable component, said second optical coupler including a light detector for detecting illumination of the light ring on the first optical coupler over a predetermined range of rotation; and
   a control circuit to determine the relative angular position of said first and second optical couplers based on the attenuation of the light detected by said light detector.

2. The rotatable connector of claim 1 including a plurality of light rings concentrically arranged around an axis or rotation, a plurality of light emitters to illuminate respective ones of said light rings, and a plurality of light detectors.

3. The rotatable connector of claim 1 wherein the first optical coupler includes a plurality of vertically stacked light rings.

4. The rotatable connector of claim 1 wherein said second optical coupler includes a second optically conductive light rings and a second light emitter to illuminate said second set of light ring, and wherein said first optical coupler includes a second set of light detector to detect illumination of said second set of light ring.

5. The rotatable connector of claim 4 wherein said first and second light rings are electrically conductive.

6. The rotatable connector of claim 5 wherein said first and second light rings are electrically connected.

7. The rotatable connector of claim 6 further including a conductive sphere interposed between said first and second light rings to electrically connect said first and second light rings.

8. The rotatable connector of claim 1 wherein said light ring has an optical gradient.

9. The rotatable connector of claim 1 further comprising a first electrical circuit connected to the first optical coupler and a second electrical circuit connected to the second optical coupler, wherein one of the first and second electrical circuits is powered by a photovoltaic cell.

10. A method of connecting electrical circuits using a rotatable connector comprising first and second optical couplers, the method comprising:
  illuminating one or more light rings in the first optical coupler; and
  detecting illumination of the one or more light rings over a predetermined range of rotation using one or more detectors in the second optical coupler; and
  detecting the relative angular position of said first and second optical couplers based on the intensity of the light detected by at least one of said detectors.

11. The method of claim 10 further comprising:
  illuminating one or more light rings in the second optical coupler; and
  detecting illumination of the one or more light rings over a predetermined range of rotation using one or more detectors in the first optical coupler.

12. The method of claim 10 further comprising electrically connecting the light rings of the first and second optical couplers.

13. A rotatable connector comprising:
  a first optical coupler adapted to mount to a first rotatable component, said first optical coupler including a first electrically and optically conductive light ring and a light emitter for illuminating said first light ring;
  a second optical coupler adapted to mount on a second rotatable component, said second optical coupler including a second electrically and optically conductive light ring and a second set of light emitter for illuminating said second light ring;
  a first light detector for detecting illumination of the light ring on the first optical coupler over a predetermined range of rotation;
  a second light detector for detecting illumination of the light ring on the second optical coupler over a predetermined range of rotation; and
  an conductive element to electrically connect said first and second light rings.

14. The rotatable connector of claim 13 wherein said conductive element comprises a conductive sphere.

15. The rotatable connector of claim 14 wherein said first and second light rings have concave surfaces to retain said conductive sphere.

16. The rotatable connector of claim 13 further comprising a position sensor to detect the relative angular position of said first and second optical couplers.

17. The rotatable connector of claim 16 wherein said position sensor is an optical sensor.

18. The rotatable connector of claim 17 wherein said position sensor detects changes in light intensity transmitted through one or more selected light rings due to relative rotation of said first and second optical couplers.

19. The rotatable connector of claim 18 wherein the selected light rings have an optical gradient.

20. The rotatable connector of claim 16 wherein said position sensor detects optical marks on one of said first and second optical couplers when said first and second optical couplers are rotated.

21. The rotatable connector of claim 16 wherein said position sensor comprises a resistive sensor to detect a change in resistance due to relative rotation of said first and second optical couplers.

22. The rotatable connector of claim 21 wherein said position sensor detects the potential difference at two points on one or more selected light rings.

23. The rotatable connector of claim 22 wherein the selected light rings have a resistive gradient.

24. The rotatable connector of claim 13 further comprising position sensing means for detecting the amount of rotation of the connector.

* * * * *